US009928473B1

(12) United States Patent
Whiting et al.

(10) Patent No.: US 9,928,473 B1
(45) Date of Patent: Mar. 27, 2018

(54) BOOSTER CENTRIC RESOURCE ALLOCATION

(71) Applicant: Target Brands, Inc., Minneapolis, MN (US)

(72) Inventors: Jacob. A. Whiting, Hopkins, MN (US); Jennifer Ptak, Minneapolis, MN (US); Bhaskar Roy, Bangalore (IN); Parag Dey, Bangalore (IN); Nikesh Suthar, Bangalore (IN); Prasunamba Bai, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 891 days.

(21) Appl. No.: 13/754,329

(22) Filed: Jan. 30, 2013

(51) Int. Cl.
*G06Q 10/00* (2012.01)
*G06Q 40/00* (2012.01)
*G06Q 10/06* (2012.01)

(52) U.S. Cl.
CPC ................ *G06Q 10/0635* (2013.01)

(58) Field of Classification Search
CPC ............................ G06F 10/0635; G06Q 10/06
USPC ......................................................... 705/7.28
See application file for complete search history.

(56) References Cited

U.S. PATENT DOCUMENTS

| 7,672,746 | B1* | 3/2010 | Hamilton et al. | 700/100 |
| 8,099,339 | B1 | 1/2012 | Pinsonneault et al. | |
| 8,452,630 | B1* | 5/2013 | Fisher et al. | 705/7.16 |
| 8,659,431 | B2* | 2/2014 | Brown | 340/573.1 |
| 8,769,412 | B2* | 7/2014 | Gill et al. | 715/736 |
| 8,831,972 | B2* | 9/2014 | Angell et al. | 705/14.26 |
| 2002/0067272 | A1 | 6/2002 | Lemelson et al. | |
| 2003/0055706 | A1 | 3/2003 | Statfeld | |
| 2004/0153663 | A1 | 8/2004 | Clark et al. | |
| 2004/0193473 | A1* | 9/2004 | Robertson et al. | 705/9 |
| 2005/0040230 | A1* | 2/2005 | Swartz et al. | 235/383 |
| 2006/0020424 | A1 | 1/2006 | Quindel | |
| 2007/0174099 | A1 | 7/2007 | Aaron et al. | |
| 2008/0201214 | A1 | 8/2008 | Aaron et al. | |
| 2009/0006286 | A1 | 1/2009 | Angell et al. | |
| 2009/0198641 | A1 | 8/2009 | Tortoriello | |
| 2010/0131284 | A1 | 5/2010 | Duffy | |

(Continued)

OTHER PUBLICATIONS

Introduction to Crime Mapping, Jun. 9, 2005.*

(Continued)

*Primary Examiner* — Alan S Miller
*Assistant Examiner* — Folashade Anderson
(74) *Attorney, Agent, or Firm* — Merek, Blackmon & Voorhees, LLC

(57) ABSTRACT

A collection of incidents is received where each incident has an associated location where the incident occurred and a date and a time when the incident occurred. A mean distance between locations associated with successive incidents in the collection of incidents is determined and a risk area is identified around each location based on the mean distance. A count for a set of at-risk locations is generated with each count being the number of risk areas where an at-risk location is positioned. For each at-risk location in the set of at-risk locations, a distance between the at-risk location and a last incident location is determined. Resources are allocated to select at-risk locations based on risk factors that are a function of the count and the distances between the at-risk locations and the last location.

24 Claims, 13 Drawing Sheets

(56) References Cited

U.S. PATENT DOCUMENTS

| | | | |
|---|---|---|---|
| 2011/0057797 A1* | 3/2011 | Parker et al. | 340/568.1 |
| 2011/0145032 A1 | 6/2011 | Stearns | |
| 2013/0103443 A1* | 4/2013 | Ptak et al. | 705/7.13 |
| 2013/0226644 A1* | 8/2013 | Alonso et al. | 705/7.17 |

OTHER PUBLICATIONS

Retail LP Analytics—A Tailored Approach to Loss Prevention CAP Index Inc., 2010.*
Wilson, Jeremy M et a.., A Performance Based Approach to Police Staffing and Allocation Michigan State University, 2012.*
Vellani, Karim H., Security Solutions for Grovery Stores Threat Analysis Group, 2003.*
May, Steven, Waking Up Wal-Mart from Its Loss Prevention Nightmare Security Magazine, Sep. 1, 2007.*
Helms, Dan, The Use of Dynamic Spatio-Temporal Analytical Techniques to Resolve Emergent Crime Series Las Vegas Police Department, 1999.*
Clarke, Ronald V., Shoplifting US Department of Justice, ISBN: 1-932582-10-X, Sep. 2003.*
CAPIndex.com Web Pages Cap Index Inc., Jan. 2011, Retrieved from Archive.org Mar. 2, 2015.*
Compstat, http://en.wikipedia.org/wiki/compstat, Sep. 30, 2011, 8 pages.
Crime Mapping, http://en.wikipedia.org/wiki/crime_mapping, Sep. 30, 2011, 3 pages.
From Description to Prediction: Crime Mapping, Tech Beat, http://www.justnet.org/techbeat%20files/crimemapsum01.pdf, 2001, 4 pages.
Crimestat, http://en.wikipedia.org/wiki/crimestat, Dec. 19, 2011, 7 pages.
British Police Trials Crime Predicting Software, http://news.softpedia.com/news/british-police-trials-crime-predicting-software-149127.s . . . , Jul. 26, 2010, 2 pages.
Derek J. Paulsen, Catching Lightining in a Bottle: Forescsting Next Events, 2005 iPSY Conference, 25 pages.
Bryan Hill, Narrowing the Search: Utilizing a Probability Grid in Tactical Analysis, http://www.scribd.com/doc/6714588/Translating-Research-Into-Practice-Reflections-on-the-Diffusion-of-Crime-Mapping-Innovation#archive, 2001, 14 pages.
Boonsri Dickinson, Police Forecast Crimes Using Earthquake Prediction Modelshttp://www.smartplanet.com/blog/science-scope/police-forecast-crimes-using-earthquake-prediction-models/9840, Aug. 17, 2011, 3 pages.
The Day Before Zero, Prediction Methods for Crime, http://blog.damballa.com/?p=1377, Nov. 4, 2011, 2 pages.
Daily Crime Forecast, http://crimeforecast.com/, Dec. 19, 2011, 3 pages.
The Economist, Crime Prediction, Time Bandits, Prospective "hotspot" maps show where criminals are going to be active, http://www.economist.com/node/2647118, Nov. 4, 2011, 2 pages.
Applying Spatiotemporal and Demographic Data to Locate Next Crime Location, http://www.math.washington.edu/~morrow/mcm/7501.pdf, Feb. 22, 2010, 16 pages.
Predictive Analytics, http://en.wikipedia.org/wiki/predictive_analytics, Sep. 30, 2011, 12 pages.

* cited by examiner

FIG. 8

| Alert No. | BOOSTER ID | MRKT | NUMBER OF INCIDENTS | ALERT MO | ALERT MERCH. | ALERT TYPE | PREDICTIONS DATE |  | PREDICTIONS TIME |  | PREDICTIONS LOCATION |  |  |
|---|---|---|---|---|---|---|---|---|---|---|---|---|---|
|  |  |  |  |  |  |  | EARLIEST HIT DATE | LATEST HIT DATE | EARLIEST HIT TIME | LATEST HIT TIME | LOC. 1 | LOC. 2 | LOC. 3 |
| 11238 | DET238 | ST LOUIS | 11 | Push | LCD TV | MERC. | 10/24/11 | 10/26/11 | 9:24 | 23:00 | 2414 | 2050 |  |
| 11102 | ORL102 | MISS | 3 | CONC. | FRAGR. | MERC. | 10/27/11 | 10/29/11 | 8:53 | 20:39 | 2055 |  |  |
| 11213 | ORL213 | MIA/FTL | 2 | FIRE | VAC. | MERC. | 10/28/11 | 10/30/11 | 11:58 | 18:18 | 2196 | 1512 |  |
| 11234 | NY234 | LONG ISL | 4 | CONC. | COMP. | MERC. | 10/25/11 | 10/31/11 | 18:05 | 19:43 | 1264 | 1885 |  |
| 11256 | NC256 | BAY AREA | 3 | CNTFT | CNTFT | FRAUD | 10/31/11 | 11/02/11 | 8:00 | 23:00 | 2238 |  |  |
| 11151 | MPL151 | MPLS. | 12 | PUSH | FORMU | MERC. | 10/22/11 | 10/26/11 | 8:00 | 22:00 | 360 | 2046 |  |
| 11165 | MPL165 | MPLS. | 6 | FIRE | FORMU | MERC. | 10/26/11 | 10/31/11 | 10:00 | 14:00 | 360 |  |  |
| 11277 | NC277 | BAY AREA | 4 | PUSH | SOUND | MERC. | 10/23/11 | 10/27/11 | 8:00 | 23:00 | 780 | 2473 |  |
| 11222 | ATL222 | ATLANTA | 6 | FIRE | FRAGR. | MERC. | 10/26/11 | 11/31/11 | 10:00 | 14:00 | 1554 | 1663 | 1666 |
| 11259 | NC259 | BAY AREA | 8 | PUSH | JEWEL | MERC. | 10/14/11 | 11/4/11 | 8:00 | 23:00 | 780 | 2473 | 2558 |

FIG. 13

| Alert No. | BOOSTER ID | MRKT | NUMBER OF INCIDENTS | ALERT MO | ALERT MERCH. | ALERT TYPE | PREDICTIONS DATE |  | PREDICTIONS TIME |  | PREDICTIONS LOCATION |  |  |
|---|---|---|---|---|---|---|---|---|---|---|---|---|---|
|  |  |  |  |  |  |  | EARLIEST HIT DATE | LATEST HIT DATE | EARLIEST HIT TIME | LATEST HIT TIME | LOC. 1 | LOC. 2 | LOC. 3 |
| 11256 | NC256 | BAY AREA | 3 | CNTFT | CNTFT | FRAUD | 10/31/11 | 11/02/11 | 8:00 | 23:00 | 2238 |  |  |
| 11277 | NC277 | BAY AREA | 4 | PUSH | SOUND | MERC. | 10/23/11 | 10/27/11 | 8:00 | 23:00 | 780 | 2473 |  |
| 11259 | NC259 | BAY AREA | 8 | PUSH | JEWEL | MERC. | 10/14/11 | 11/4/11 | 8:00 | 23:00 | 780 | 2473 | 2558 |

FIG. 10 — Table 1000

| Alert | | |
|---|---|---|
| # of days (1002) | Location order # (1004) | Flag 1 (1006) |
| <=7 days | 1,2 | 1 | (1008)
| <=7 days | 3,4,5 | 2 | (1010)
| 8-14 days | 1,2 | 3 | (1012)
| 8-14 days | 3,4,5 | 4 | (1014)
| >=14 days | 1,2,3,4,5 | 5 | (1016)

FIG. 11 — Table 1100

| Staffing | | | |
|---|---|---|---|
| Security (1102) | Investigator (1104) | Leadership (1106) | Flag 2 (1108) |
| None | None | Top Level | 1 | (1110)
| None | None | Mid Level | 2 | (1112)
| None | None | None | 3 | (1114)
| Yes | Yes | Top Level | 4 | (1116)
| Yes | Yes | Mid Level | 5 | (1118)
| Yes | Yes | None | 6 | (1120)
| Yes | None | Top Level | 7 | (1122)
| Yes | None | Mid Level | 8 | (1124)
| Yes | None | None | 9 | (1126)

FIG. 12 — Table 1200

| Flag 1 (1202) | Flag 2 (1204) | Priority (1206) |
|---|---|---|
| 1 | 2,3 | 1 | (1208)
| 1 | 1,4,5,6,7,8,9 | 2 | (1210)
| 2,3 | 1 | 2 | (1212)
| 2,3 | 2,3,4,5,6,7,8,9 | 3 | (1214)
| 4,5 | 1,2,3,4,5,6,7,8,9 | 3 | (1216)

BOOSTER CENTRIC RESOURCE ALLOCATION

BACKGROUND

Assets protection departments in retail stores often investigate thefts and frauds to determine whether a single person or group of people is responsible for multiple illegal activities. In some departments, this is done by reviewing recorded video surveillance of different stores that have experienced illegal activities over a period of time. Once a person or a group has been identified, stores are alerted to look for the person or group. People and groups who are involved in repeated illegal activities are sometimes referred to as "Boosters."

The discussion above is merely provided for general background information and is not intended to be used as an aid in determining the scope of the claimed subject matter. The claimed subject matter is not limited to implementations that solve any or all disadvantages noted in the background.

SUMMARY

A collection of incidents is received where each incident has an associated location where the incident occurred and a date and a time when the incident occurred. A mean distance between locations associated with successive incidents in the collection of incidents is determined and a risk area is identified around each location based on the mean distance. A count for a set of at-risk locations is generated with each count being the number of risk areas where an at-risk location is positioned. For each at-risk location in the set of at-risk locations, a distance between the at-risk location and a last incident location is determined. Resources are allocated to select at-risk locations based on risk factors that are a function of the count and the distances between the at-risk locations and the last location.

In accordance with other embodiments, a collection of incidents perpetrated by a single entity is received where the collection of incidents indicates a date for each incident. A mean and standard deviation for the number of days between successive incidents in the collection of incidents are determined. The standard deviation is compared to a threshold. If the standard deviation is greater than the threshold, resource allocations are set without reference to the single entity. If the standard deviation is less than the threshold a range of dates during which a next incident is predicted to be perpetrated by the single entity is set and additional resources are assigned during the range of dates to apprehend the single entity.

In accordance with further embodiments, a processor accesses information describing a series of events involving a person. The information for each event includes a location where the event occurred, a date when the event occurred and a time when the event occurred. The processor determines a mean time when the events in the series of events occurred and a standard deviation for the times when the events in the series of events occurred. The processor sets a range of predicted times when a next event should occur that involves the person. Setting the range involves setting an earliest time for the event as the mean time minus two times the standard deviation and setting a latest time for the event as the mean time plus two times the standard deviation. The processor then designates that additional personnel should be assigned during the range of predicted times to prevent the next event from occurring.

In accordance with a further amendment, a selection of an alert is received and a user interface is provided. The user interface includes a map displaying markers for locations where a booster associated with the alert is predicted to appear, each marker providing an associated priority for assigning resources to the location. The user interface also includes a date range over which the booster is predicted to appear and a time range over which the booster is predicted to appear.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is an example of a Booster predictions spreadsheet.

FIG. 10 is a logic table showing logic for setting values for Flag 1.

FIG. 11 is a logic table for setting values for Flag 2.

FIG. 12 is a logic table showing the setting of the priority levels based on Flag 1 and Flag 2.

FIG. 13 is an example of a predictions spreadsheet sent to an investigations center.

DETAILED DESCRIPTION

Embodiments described below provide a means for predicting locations, date ranges, and time ranges when a particular individual or group of individuals will take an unwanted action. For example, the system can predict when a Booster will attempt to steal or pass counterfeit money or stolen checks and will predict a set of stores at which the Booster will take these actions. By predicting the possible locations, range of dates and range of times, the present system provides a means for allocating additional security resources, such as additional security personnel so that the additional personnel are most effective at apprehending individuals who have perpetrated a series of crimes.

Figure 1:
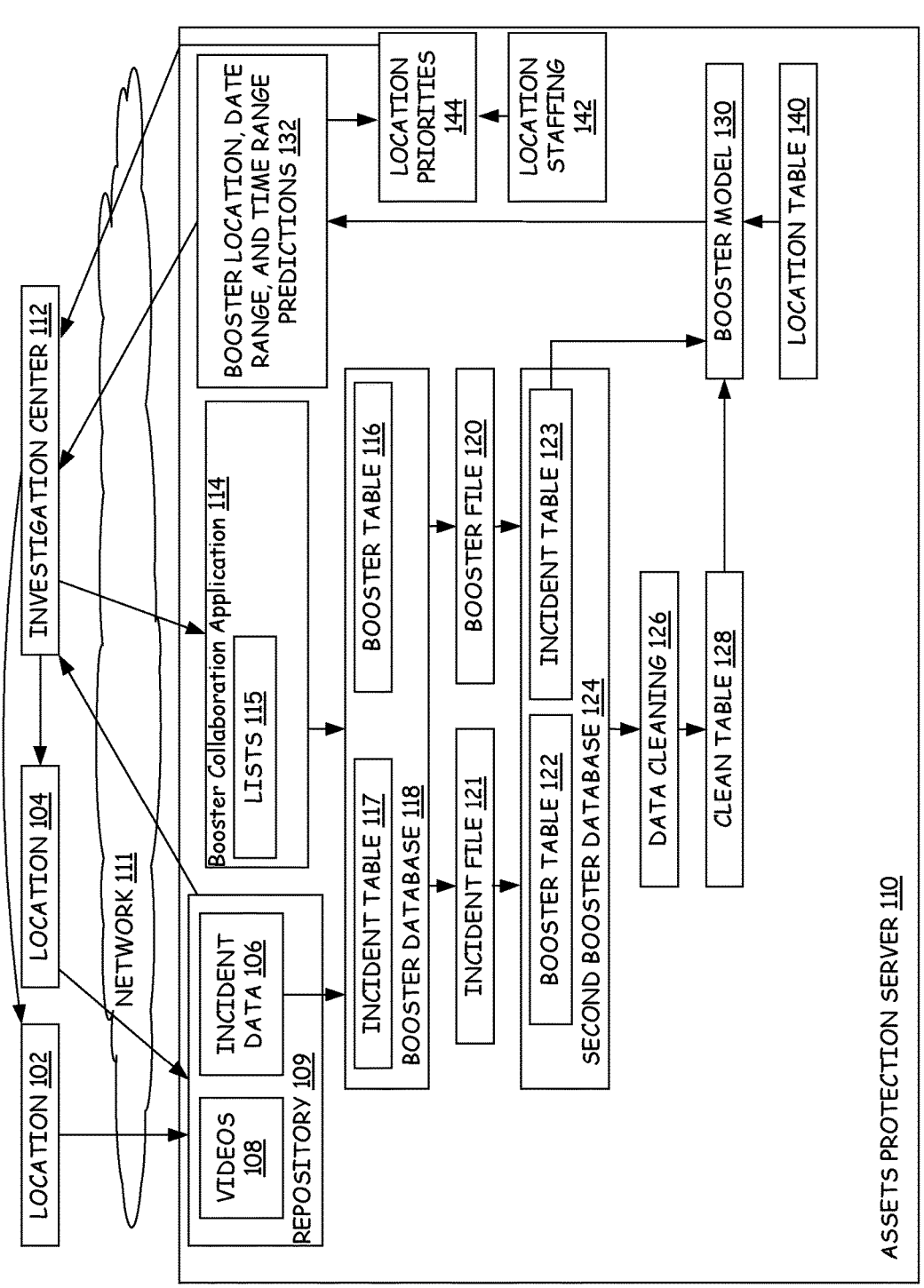
FIG. 1 is a block diagram of an assets protection system in accordance with some embodiments.
Figure 2:
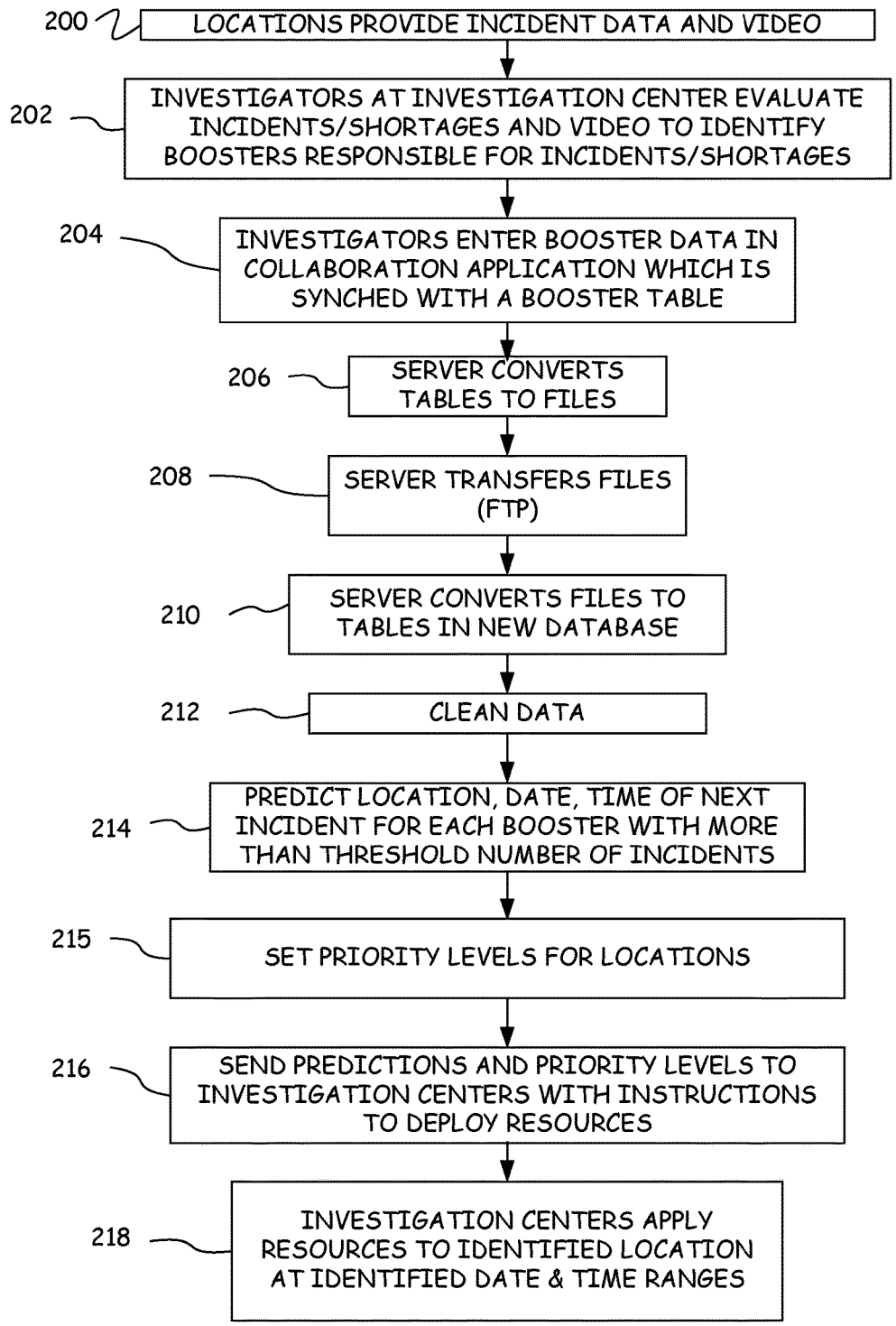
FIG. 2 is a flow diagram for allocating resources based on events occurring in stores.

FIG. 1 provides a block diagram of an assets protection system used in a method of predicting future Booster events, which is depicted in the flow diagram of FIG. 2.

In step 200 of FIG. 2, locations such as locations 102 and 104 provide incident data 106 and videos 108 to an asset protection server 110 via network 111. Incident data 106 can include information about an incident including the type of incident, such as a theft or fraud; as well as the modus operandi (M.O.) of the perpetrator of the incident, such as concealing an item and walking out the main exit, taking an item and walking out a fire exit, or concealing an item in a lower part of the shopping cart. The incident data will also include the time and date when the incident took place and the location where the incident took place. Incident data 106 may further include a description of the perpetrator or perpetrators of the incident. For retail stores, the incident data may also include an identification of the merchandise that was taken and/or may include shortage data indicating the amount of merchandise that has been taken from a particular area over some period of time. Videos 108 can include still pictures and full motion videos that capture an image of one or more perpetrators of an incident. Multiple separate videos may be provided for a single incident. Locations 102 and 104 may select the videos that are provided to assets protection server 110 or may simply provide all videos captured by locations 102 and 104 with location and time stamp information provided on each video. The incidents captured by the incident data 106 and videos 108 can include theft, fraud, destruction of property, and harm to other people. Incident data 106 and videos 108 are stored in an incident repository 109 on assets protection server 110.

At step 202, investigators at an investigation center 112 review incident data 106 and videos 108 to determine if incidents at one or more locations are being perpetrated by the same single entity such as a person (individual) or group of people (gang), both referred to generically as a "Booster." When a Booster is identified, investigators at the investigation center 112 create an alert in a Booster collaboration application 114, such as Sharepoint® from Microsoft®, provided by assets protection server 110. At step 204, Booster collaboration application 114 allows an investigator to enter multiple incidents captured in incident data 106 and videos 108 and assign those multiple incidents to a single Booster. In accordance with some embodiments, Booster collaboration application 114 stores its data as a series of lists 115 that are synched with a Booster table 116 within a database 118. Incident data 106 may also take the form of a collaboration application list that is synched with an incident table 117 within database 118. In the list of incidents in incident data 106, each incident has an associated location where the incident occurred and a date and time when the incident occurred.

At step 206, Booster table 116 is converted into a Booster file 120 and incident table 117 is converted into an incident file 121. In accordance with one embodiment, Booster file 120 and incident file 121 are standard form files such as a Comma Separated Value (.CSV) files. This can be performed by a data extraction process that is automatically activated within asset protection server 110 every day or multiple times per day. This creates a generic version of the data in Booster table 116 and allows the data to be translated between the database system of database 118 and a second database system of second database 124.

At step 208, the Booster file 120 and incident file 121 are transferred using a file transfer protocol (FTP), which makes them available for conversion into a Booster table 122 and an incident table 123 in second database 124 at step 210.

Figures 3, 4:
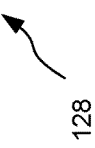
FIG. 3 is an example of an alerts data table before the data has been cleaned.
FIG. 4 is an example of an alerts data table after the data has been cleaned.

FIG. 3 provides an example of a Booster table 122. Booster table 122 includes the following columns: alert number 300, investigation center 302, alert date 304, market 306, alert status 308, number of events 310, created date 312, modified date 314, alert M.O. 316, alert merchandise 318, alert type 320, and incidents 322, 324, 326, 328, 330, and 332. Alert number column 300 provides an identifying number for incidents that have been grouped together to be associated with a single Booster. Investigation center column 302 identifies the investigation center that created the alert. Market column 306 identifies the market that the locations involved in the incidents fall within. If the locations cross different markets, an indication of multiple markets can be included in the column. Alert date column 304 indicates the date that multiple incidents were first assigned to a Booster. Number column 310 indicates the number of incidents that have been assigned to the Booster. Created column 312 indicates the date that a current entry in Booster table 116 was created. Modified column 314 indicates a date and time that an alert indicated by alert number 300 was last modified. Alert M.O. column 316 indicates a modus operandi of the Booster and in some embodiments is selected from a list of pre-designated M.O.s. Alert merchandise column 318 indicates a type of merchandise that was involved in the last incident associated with the Booster. In some embodiments, the alert merchandise type 318 is selected from a list of pre-designated merchandise types. Alert type column 320 indicates a type for the incidents that have been associated with the Booster. Alert types include merchandise theft, fraud, and store security, for example.

Incident columns 322, 324, 326, 328, 330 and 332 provide keys to incident entries in an incident table 123. Incident table 123 includes an incident number for each incident, a date and time of each incident, a store location of each incident, a dollar amount involved in each incident, and a merchandise type involved in each incident. Although only 6 incident columns are shown in FIG. 3, any desired number of incident columns may be provided so as to support the maximum number of incidents to be expected for any one Booster. The incidents in incident columns 322, 324, 326, 328, 330, and 332 represent a series of events involving the Booster. Although the incidents may be referred to as a series of events, they do not need to be stored in incident columns 322, 324, 326, 328, 330 and 332 in any particular order based on when they occurred.

In accordance with some embodiments, it is possible to have multiple rows with a same alert number in Booster table 122. In particular, it is possible for a second row to be added that is an update of an existing alert. For example, in FIG. 3 row 352 is an update of the alert in row 350. Row 350 and row 352 have the same alert number "716" but alert entry 352 has a later modified date 354 than modified date 356 of entry 350. As such, entry 352 represents a more up to date version of the alert represented by alert number "716" than entry 350. In addition, row 350 shows two incidents for the alert and row 352 shows six incidents for the alert.

At step 212, the duplicate entries in Booster table 122 are cleaned from the table. During cleaning step 212, only the last modified alert entry for an alert number is retained and all other entries for the same alert number are removed. The data cleaning 126 results in clean table 128.

FIG. 4 provides an example of a clean Booster table 128, which represents a clean version of database table 122 of FIG. 3. In FIG. 4, alert entry 350 of FIG. 3 has been removed as being redundant to alert entry 352 since both entries include the same alert number "716" but alert entry 352 has a later modified date 354 than modified date 356 of entry 350.

At step 214, a clean table is provided to a Booster model 130 which predicts locations, date ranges, and time ranges of a next incident for each Booster with more than a threshold number of incidents in the clean table. The predictions made in step 214 are discussed in more detail below. The predictions result in Booster location, date range, and time range predictions 132. Under some embodiments, the threshold number of incidents required before a prediction is made is 3 incidents.

At step 216, select ones of the predictions 132 are sent to investigation centers 112 with instructions/recommendations to deploy additional resources at the locations and during the date range and date times provided in the predictions. These additional resources are designed to intercept or apprehend the Boosters for whom the predictions have been generated and/or to prevent a next incident or event involving the Booster from occurring. The instructions to deploy additional resources can include instructions to deploy additional personnel to view videos 108 in real time for each of the locations that are predicted to be hit by the Booster during the date range and time range set by the predictions. In other embodiments, the instructions to deploy resources can involve instructions to deploy additional personnel to the predicted locations during the date range and time range in the predictions. At step 218, the investigation centers apply or allocate additional resources to the predicted locations during the predicted date and time ranges.

Figure 5:
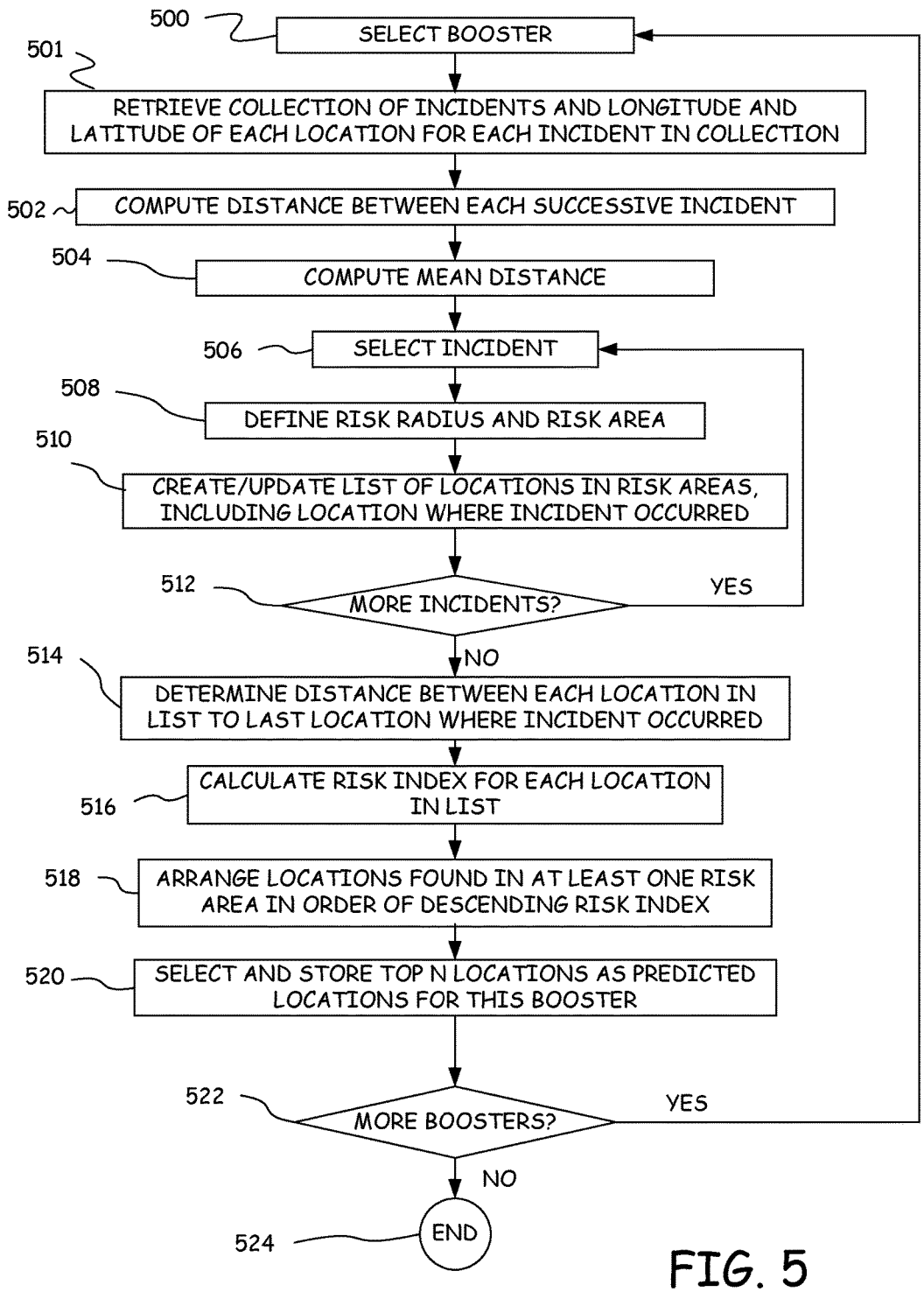
FIG. 5 is a flow diagram of a method of predicting stores where a Booster will strike next.

FIG. 5 provides a flow diagram of a method of predicting locations where a Booster will strike next. At step 500, a Booster from clean table 128 is selected and at step 501 Booster model 130 retrieves the collection of incidents assigned to the Booster in clean table 128. Each incident in the collection of incidents has an associated entry in incident table 123 that identifies the location, date and time when the incident occurred. Booster model 130 then retrieves the longitude and latitude of each location where an incident in the collection of incidents occurred. The longitude and latitude information may be found by taking the location identifier associated with the incident from incident table 123 and acquiring the longitude and latitude values for the location from location table 140.

At step 502, Booster model 130 computes a distance between the locations of each successive incident found in the collection of incidents for the Booster. Thus, the longitude and latitude of each location where a Booster has struck is used to compute a distance between locations of successive incidents where incidents are successive if they occur after one another in time.

At step 504, Booster model 130 computes a mean distance between locations of successive incidents. This mean distance may be computed by summing the distances between locations of successive incidents and dividing by the number of incidents minus one.

At step 506, one of the incidents in the collection of incidents is selected and at step 508 a risk radius is defined around the location where the incident took place. In accordance with one embodiment, the risk radius is defined as being equal to the mean distance computed in step 504 times a weighting value. In accordance with one embodiment, the weighting value is equal to 1.5. The risk radius is then used to define a risk area, which in accordance with one embodiment is a circle with a radius equal to the risk radius.

At step 510, Booster model 130 examines location table 140 to identify a set of locations that are positioned within the risk area including the location where the selected incident occurred. Each such location is referred to as an at-risk location. In accordance with one embodiment, each of the at-risk locations comprises a store in a chain of stores owned by a retail corporation. For the first risk area, each at-risk location identified at step 510 is assigned a count of 1 to indicate that the at-risk location is found within one risk area.

At step 512, Booster model 130 determines if there are more incidents in the collection of incidents for the current Booster. If there are more incidents, a new incident is selected by returning to step 506, and steps 508 and 510 are repeated for the new incident location. Thus, a new risk area is defined for the new incident location at step 508. During step 510, if a location in the new risk area is already part of the set of at-risk locations, its count is incremented by 1 so that the count continues to indicate the number of risk areas the at-risk location is found within. If a new at-risk location is identified during step 510, it is assigned a count of 1.

When there are no more incidents in the collection of incidents associated with the current Booster at step 512, the process of FIG. 5 continues at step 514 where the server determines the distance between the last location where an incident in the collection of incidents occurred and each of the locations in the set of at-risk locations. These distances may be computed based on the longitude and latitude of each location taken from location table 140. The last location where an incident occurred is the location with the latest incident date and time in the collection of incidents for the Booster.

At step 516, Booster model 130 calculates a risk factor or index for each at-risk location. In accordance with one embodiment, the risk index is computed as a function of the count for the at-risk location and the distance between the at-risk location and the last location. In accordance with one embodiment, the risk index is computed as the number of risk areas the location was found within divided by the log of the distance between the at-risk location and the location of the last incident in the collection of incidents. At step 518, the at-risk locations are arranged in order of descending risk index and at step 520, the top N locations are selected and stored in Booster predictions 132 along with their order number as predicted locations where the Booster will strike next. The location that has the highest risk index is given order number 1, the location with the next highest risk index is given order number 2 and so forth. In accordance with one embodiment, the top 5 locations with the highest risk indices are selected at step 520. Thus, Booster model 130 forms a ranked list of at-risk locations with a top part (the top N locations) and a bottom part (the remaining locations) and additional resources/personnel are only assigned to the at-risk locations in the top part of the ranked list. The number of locations that are selected is determined by balancing the cost of assigning additional resources to a large number of locations against ensuring that all locations where a Booster may strike are included.

At step 522, the server determines if there are more Booster alerts in clean table 128. If there are more Booster alerts, the next Booster is selected by returning to step 500. When there are no more Booster alerts, the process ends at step 524.

Figure 6:
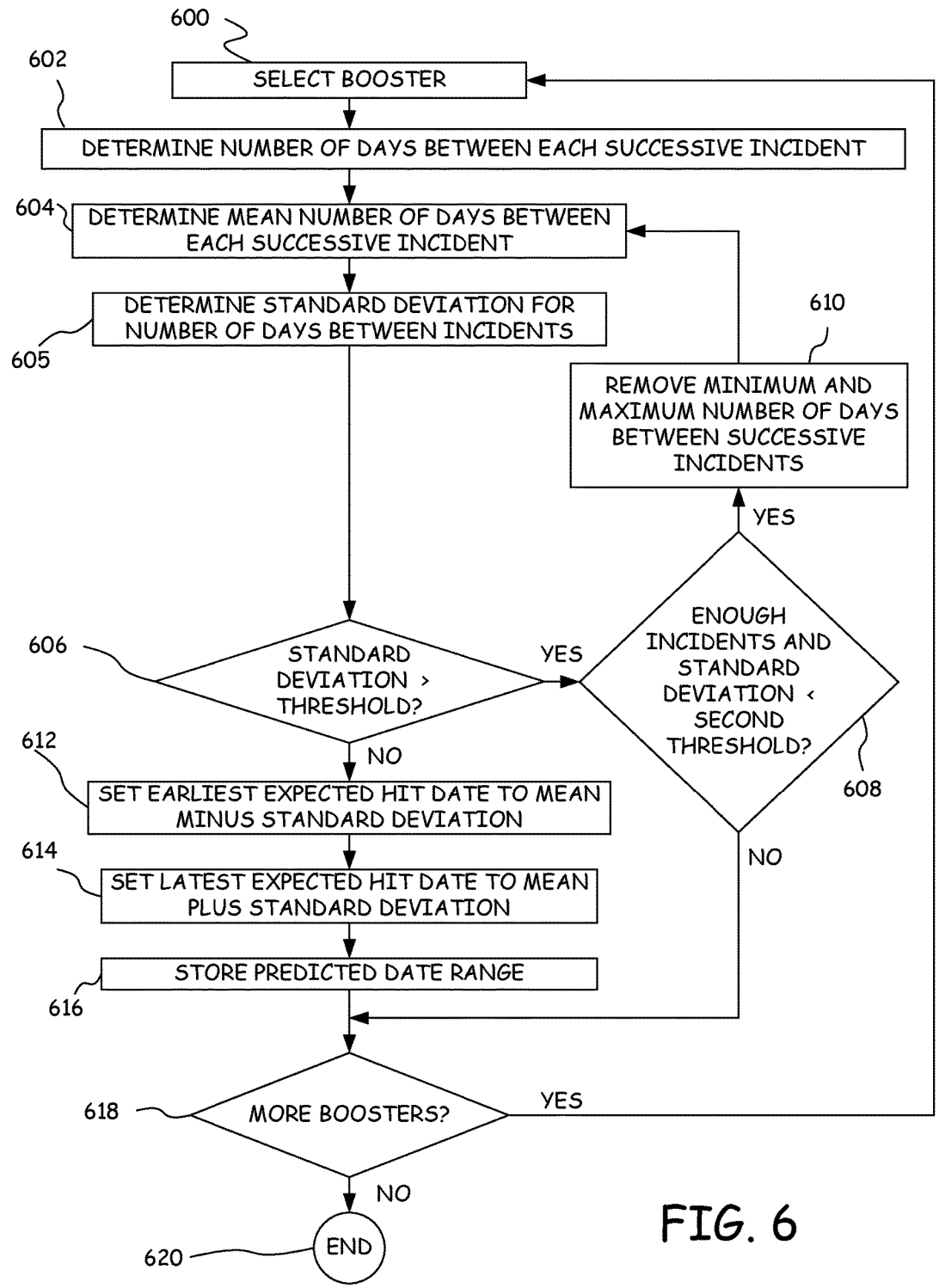
FIG. 6 is a flow diagram of a method of predicting a range of dates during which a Booster will strike next.

FIG. 6 provides a flow diagram of a method for predicting a date range for when a Booster will strike next.

At step 600, a Booster is selected from clean table 128. At step 602, Booster model 130 determines the number of days between each successive incident in the collection of incidents associated with the selected Booster in clean table 128. Incidents are successive if they occur one after another in time. Incidents that occur on the same day are separated by zero days during this computation. The dates of each incident are available in incident table 123.

At step 604, Booster model 130 determines a mean number of days between successive incidents. In accordance with one embodiment, the determination of the mean number of days is made by summing the number of days between successive incidents and dividing by the number of incidents minus 1. At step 605, Booster model 130 determines the standard deviation of the number of days between successive incidents. Under one embodiment, this is computed by determining the difference between the number of days between successive incidents and the mean number of days between successive incidents for each pair of successive incidents, squaring each difference, summing the squares, dividing by the number of pairs of successive incidents, and taking the square root of the result. In terms of an equation:

$$\sigma = \sqrt{\frac{\sum_{i=1}^{I}(\text{interval}_i - \mu)^2}{I}}$$

where $\sigma$ is the standard deviation, $\mu$ is the mean number of days for intervals between successive incidents for this Booster, interval, is the number of days for the $i^{th}$ interval between successive incidents for this Booster and I is the number of intervals between successive incidents, which is equal to one less than the number of incidents.

At step 606, Booster model 130 determines if the standard deviation is greater than a predetermined threshold. A standard deviation that is greater than the threshold indicates that the behavior of the Booster is not predictable enough to warrant allocating additional resources to intercept or apprehend the Booster. In accordance with a further embodiment, the threshold for the standard deviation ratio is 1.15 times the mean number of days. If the standard deviation is greater than the threshold, the method continues at step 608 where Booster model 130 determines if the standard deviation should be determined again. In accordance with one embodiment, this involves determining if there are enough incidents to allow the largest and smallest intervals to be removed from the computation of the mean interval and standard deviation. In accordance with one embodiment, at least nine incidents are needed in order to allow the largest and smallest intervals to be removed. In accordance with some embodiments, determining whether the standard deviation should be determined again also involves comparing the standard deviation to a second larger threshold, which in accordance with one embodiment is 2.0 times the mean number of days. If the standard deviation is less than the second threshold and there are enough incidents, Booster model 130 removes the largest interval between incidents and the smallest interval between incidents at step 610 and then recalculates the mean and standard deviation at steps 604 and 605. Expressed differently, Booster model 130 removes a first number of days between incidents and a second number of days between incidents.

If there are not enough incidents to allow the largest and smallest intervals to be removed from the computation of the mean and standard deviation, the standard deviation cannot be improved. As such, Booster model 130 marks an entry for the Booster in Booster predictions 132 so that the stores will be informed of the Booster but will not be instructed to assign additional resources for this Booster. The reason for not assigning additional resources when the standard deviation is greater than the threshold is that a large standard deviation indicates that the behavior of the Booster is not predictable enough to warrant allocating additional resources to intercept or apprehend the Booster. Thus, resource allocations will be set without reference to the Booster.

If there are enough incidents to allow the largest and smallest intervals to be removed from the computation of the mean and standard deviation but the standard deviation is larger than the second threshold, the behavior of the Booster is considered to be too erratic to predict when the Booster will strike next. As such, the stores will be informed of the Booster but will not be instructed to assign additional resources for this Booster. Thus, resource allocations will be set without reference to the Booster.

In accordance with some embodiments, steps 608 and 610 are not performed. In such embodiments, if the standard deviation is greater than the threshold at step 606, the Booster is considered to be too erratic and the stores will be informed of the Booster but will not be instructed to assign additional resources for this Booster. Thus, resource allocations will be set without reference to the Booster.

If the standard deviation is less than the threshold at step 606, either initially or after removing the largest and smallest intervals, Booster model 130 sets an earliest expected hit date for when the Booster is predicted to strike next at step 612. In accordance with one embodiment, the earliest expected hit date is set equal to the date of the last incident in the collection of incidents plus the mean number of days between successive incidents minus the standard deviation of the number of days between successive incidents. Booster model 130 then sets the latest expected hit date for when the Booster is predicted to strike next at step 614. In accordance with one embodiment, the latest expected hit date is set to the date of the last incident in the collection of incidents plus the mean number of days between successive incidents for this Booster plus the standard deviation of the number of days between successive incidents. Thus, through step 612 and 614, Booster model 130 is able to set a date range for when the Booster is predicted to strike next. At step 616, Booster model 130 stores the predicted date range for the Booster in Booster predictions 132.

At step 618, Booster model 130 determines if there are more Boosters. If there are more Boosters at step 618, a next Booster is selected by returning to step 600 and steps 602 through 618 are repeated for the next Booster. When there are no more Boosters in clean table 128, the process of FIG. 6 ends at step 620.

Figure 7:
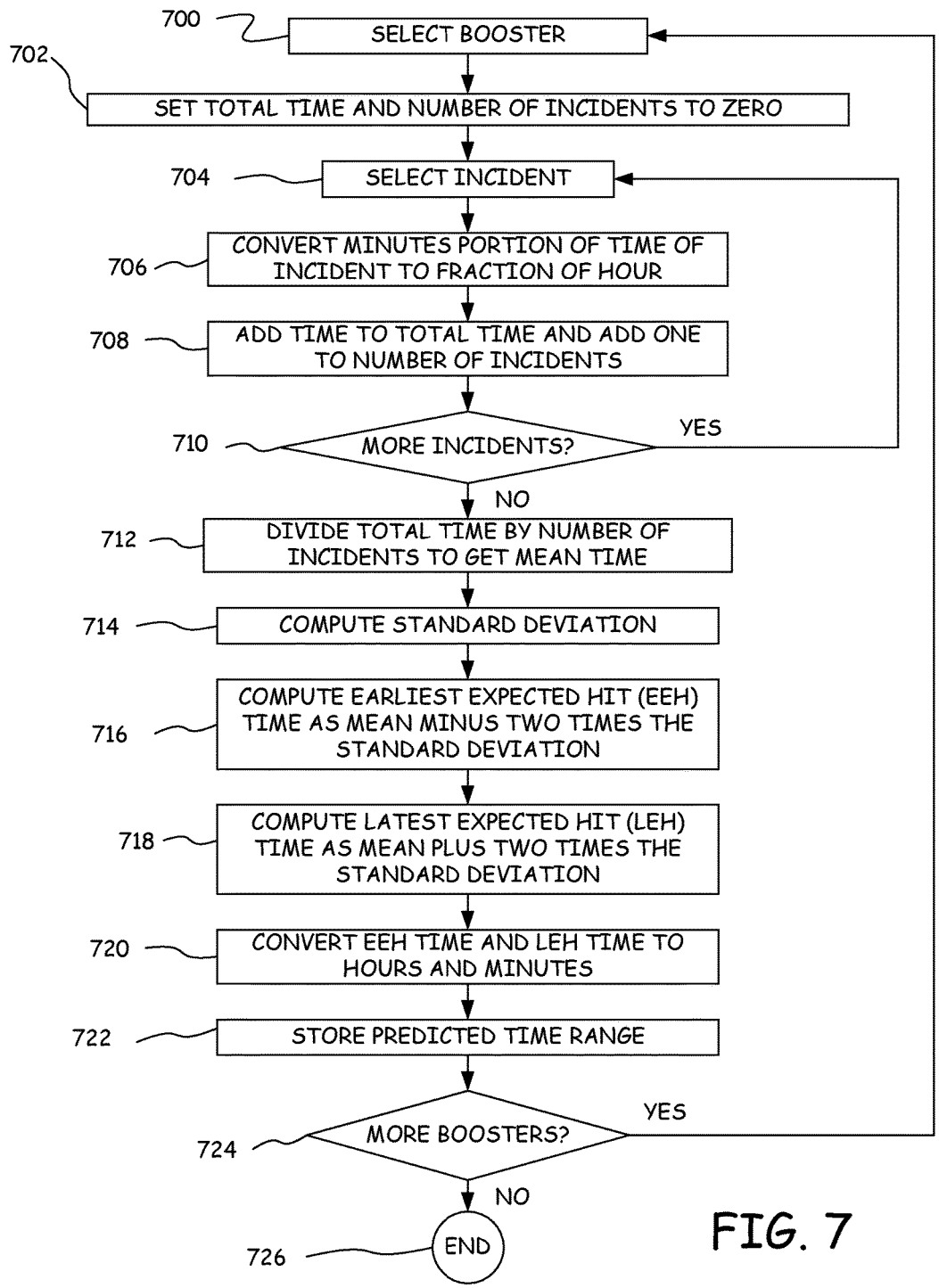
FIG. 7 is a flow diagram of a method of computing a range of times during which a Booster will strike next.

FIG. 7 provides a flow diagram of a method of setting a time range when a Booster is predicted to strike next. At step 700, a Booster is selected from clean table 128. At step 702, a time total and a number of incidents are set to zero. At step 704, an incident is selected for the current Booster. At step 706, the time of the incident is accessed and the minutes portion of the time is converted into a fraction of an hour. For example, 30 minutes is converted to 0.5 hours. This conversion can be accomplished by dividing the minutes by sixty. At step 708, the hour designation of the time of the incident and the fractional hour represented by the minutes are added to the total time and a value of 1 is added to the number of incidents. At step 710, Booster model 130 determines if there are more incidents. If there are more incidents, the next incident is selected by returning to step 704 and step 706 through 710 are repeated. When there are no more incidents for the current Booster at step 710, Booster model 130 divides the total time by the number of incidents at step 712 to get a mean time.

At step 714, the standard deviation of the incident times relative to the mean time is computed. In one embodiment, this is determined by determining the square of the difference between the mean time and each incident time, summing the squares, dividing by the number of incidents, and taking the square root of the result. In terms of an equation:

$$\sigma_t = \sqrt{\frac{\sum_{z=1}^{Z}(t_{z}-\mu_t)^2}{z}}$$

where $\sigma_t$ is the standard deviation of the time, $\mu_t$ is the mean time of the incidents, $t_z$ is the time of the $z^{th}$ incident, and Z is the total number of incidents.

At step 716, Booster model 130 computes the earliest expected hit time as the mean hit time minus 2 times the standard deviation. In terms of an equation:

$$EEH_t = \mu_t - 2\sigma_t$$

where $EEH_t$ is the earliest expected hit time, $\mu_t$ is the mean time, and $\sigma_t$ is the standard deviation.

At step 718, Booster model 130 computes a latest expected hit time as the mean time plus 2 times the standard deviation. In terms of an equation:

$$LEH_t = \mu_t + 2\sigma_t$$

where $LEH_t$ is the latest expected hit time, $\mu_t$ is the mean time, and $\sigma_t$ is the standard deviation. The earliest expected hit time and the latest expected hit time together define a range of predicted times when an incident should be perpetrated by the selected Booster. Thus, steps 716 and 718 involve setting a time range during which resources are to be allocated to at-risk locations based on the times when incidents in the collection of incidents occurred.

At step 720, the earliest expected hit time and the latest expected hit time are converted into hours and minutes. This is done by multiplying the fractional portions of each of the earliest expected hit time and the latest expected hit time by 60 to obtain the minutes designation for each hit time and using the integer portion of the earliest expected hit time and latest expected hit time as the hours portion for those times. At step 722, the predicted time range is stored in Booster predictions 132.

At step 724, Booster model 130 determines if there are more Boosters. If there are more Boosters, the process returns to step 700 and steps 702 through 722 are repeated for the next Booster. When there are no further Boosters, the process ends at step 726.

FIG. 8 provides an example of Booster predictions 132. In FIG. 8, Booster predictions 132 are organized within a table 801 having alert number column 800, Booster ID column 802, market column 804, number of incidents column 806, alert M.O. column 808, alert merchandise column 810, alert type column 812, earliest hit date prediction column 814, latest hit date prediction column 816, earliest hit time prediction column 818, latest hit time prediction column 820, and location columns 822, 824, and 826. Alert number column 800 uniquely identifies the current alert prediction, Booster ID column 802 identifies the particular individual or group of individuals who are the subject of the alert, market column 804 designates a collection of locations and is used to identify an investigation center responsible for the locations and number of incidents column 806 indicates the number of previous incidents associated with the Booster. Alert M.O. column provides the modus operandi of the Booster, alert merchandise column 810 indicates the type merchandise involved in the latest incident tied to this Booster, and alert type column 812 indicates the type of alert involved such as merchandise theft or fraud. Earliest predicted hit date column 814 and latest predicted hit date column 816 together provide a date range when the Booster is expected to strike next. Earliest predicted hit time column 818 and latest predicted hit time column 820 provide a time range when the Booster is expected to strike next. Location columns 822, 824, and 826 identify locations where the Booster is predicted to strike next and are arranged in sequential order based on their risk index with location 1 being the most likely location where the Booster will strike next. Although only 3 location columns are provided in FIG. 8 because of space limitations in the drawings, in other embodiments, a location column is provide for each of the top 5 locations of step 520. In accordance with some embodiments, some location columns can be placed in additional tables that are tied to table 801.

An example of a Booster prediction is entry 830 which has associated alert number "11234" and Booster ID NY234. The prediction is for the Long Island market and the Booster has four previous incidents which are the basis for this prediction. The Booster's M.O. is to conceal merchandise ("CONC.") as indicated by column 808. The last type of merchandise that was stolen by the Booster was computer accessories ("COMP.") as indicated by column 810. The date range when Booster NY234 is predicted to strike next is from Oct. 25, 2011-Oct. 31, 2011. The time range during when Booster NY234 is expected to strike next is between 18:05 and 19:43 (6:05 pm-7:43 pm) as indicated by columns 818 and 820. The Booster is predicted to strike one of two locations: location 1264 or location 1885.

In FIG. 8, Booster alerts that were determined in FIG. 6 to not require the allocation of additional resources to intercept or apprehend the Booster are shown as shaded rows as indicated by the cross-hatching. For example, rows 844 and 846 contain alerts for which the investigation centers should not assign additional resources.

At step 215 of FIG. 2, assets protection server 110 sets priority levels for each location where an incident has been predicted to take place in step 214. The priority levels provide an indication to managers of the relative importance of assigning additional resources to various locations. Thus, using the priority levels, managers are able to prioritize which locations should receive resources first.

Figure 9:
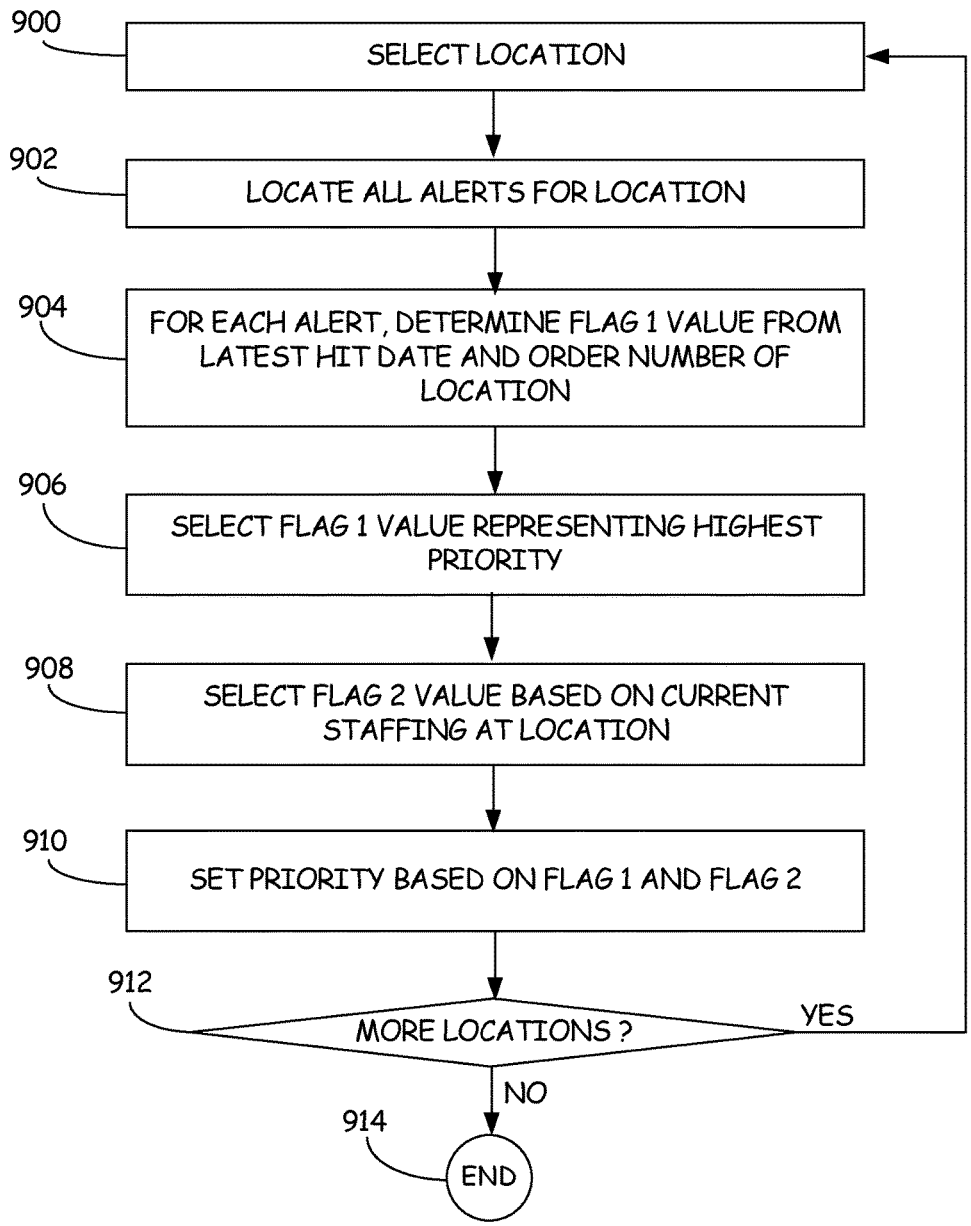
FIG. 9 is a flow diagram of a method of setting priority levels for locations.

FIG. 9 provides a flow diagram of steps that are implemented by assets protection server 110 to set priority levels for each location. In step 900, server 110 selects a location. At step 902, all alerts set for the selected location are retrieved from Booster predictions 132. For each alert, server 110 determines a Flag 1 value based on the latest hit date and the order number (risk index) of the location in the alert at step 904. In FIG. 8, the latest hit date is found in column 816 and the location order numbers are found in columns 822, 824 and 826. Specifically, locations in column 822 have an order number 1, locations in column 824 have an order number 2, and locations in column 826 have an order number 3. Although only three locations are shown in FIG. 8, in other embodiments, five locations will be present for example.

Step 904 involves applying the latest hit date and the order number for the location to a set of rules to determine the values for Flag 1. FIG. 10 provides a table 1000 that represents the rules used to form the values for Flag 1. In column 1002 of FIG. 10, the number of days between the current date and the latest hit date are designated. In column

1004, the order numbers of the locations are designated. In column 1006, the values for Flag 1 are designated. Row 1008 represents a rule that states that if the number of days between the current date and the last hit date is less than or equal to 7 days and the order number of the store in the current alert is 1 or 2, the flag value is set to 1. Row 1010 represents a rule that states that if the number of days between the current date and the last hit date is less than or equal to 7 days and the order number for the location is 3, 4 or 5, the value for Flag 1 is set to 2. Row 1012 represents a rule that states that if the number of days between the current date and the last hit date is between 8 and 14 days, inclusive, and the order number for the location is 1 or 2, the value for Flag 1 is set to 3. Row 1014 represents a rule that states that if the number of days between the current date and the last hit date is between 8 and 14 days, inclusive, and the location order number is 3, 4 or 5, the value for Flag 1 is set to 4. Row 1016 represents a rule that states that if the number of days between the current date and the last hit date is greater than 14 days and the order number for the location is 1, 2, 3, 4 or 5, the value for Flag 1 is set to 5.

Step 904 is performed for each alert involving the currently selected location. At the end of step 904, a collection of values for Flag 1 has been produced with a separate value for each alert involving the selected location and the Booster.

At step 906, the Flag 1 value representing the highest priority in the collection of Flag 1 values is selected for the location. In FIG. 10, the highest priority value for Flag 1 is 1 and the lowest priority value is 5. Thus, if the collection of Flag 1 values included values of 2, 2, 3, 4, 4 and 5, step 906 would select 2 as the Flag 1 value representing the highest priority for the location.

At step 908, a Flag 2 value is selected for the current location based on current staffing at the location. In step 908, server 110 retrieves staffing information for the current location from a location staffing table 142. Using the staffing information, server 110 sets a value for Flag 2 using the logic shown in table 1100 of FIG. 11. Logic table 1100 includes three staffing columns 1102, 1104 and 1106 and a flag value column 1108. Staffing column 1102 indicates whether security personnel have been assigned to the location, staffing column 1104 indicates whether an investigator has been assigned to the location and staffing column 1106 indicates the type, if any, of assets protection leadership that has been assigned to the location.

Rows 1110, 1112 and 1114 represent rules that are implemented when no security personnel and no investigator have been assigned to the location but different levels of leadership have been assigned to the location. Specifically, if top level leadership has been assigned to the location, Flag 2 is set to 1 as indicated by row 1110. If mid-level leadership has been assigned to the location, Flag 2 is set to 2 as indicated by row 1112. If no leadership has been assigned to the location, Flag 2 is set to 3 as indicated by row 1114.

Rows 1116, 1118 and 1120 represent situations where both security personnel and an investigator have been assigned to the location but different levels of leadership have been assigned to the location. In row 1116, Flag 2 is set to 4 if top level leadership has been assigned to the location. In row 1118, Flag 2 is set to 5 if mid-level leadership has been assigned to the location. In row 1120, Flag 2 is set to 6 if no leadership has been assigned to the location.

Rows 1122, 1124 and 1126 represent situations where security personnel have been assigned to the location but no investigators have been assigned to the location. In row 1122, if top level leadership has been assigned to the location, Flag 2 is set to 7. In row 1124, if mid-level leadership has been assigned, Flag 2 value is set to 8. In row 1126, if no leadership has been assigned to the location, Flag 2 is set to 9.

At step 910, the priority for the location is set based on the Flag 1 and Flag 2 values using a set of rules represented by table 1200 of FIG. 12, for example. In table 1200, column 1202 contains the Flag 1 value, column 1204 contains the Flag 2 value, and column 1206 contains the resulting priority value.

In row 1208 of FIG. 12, a Flag 1 value of 1 and Flag 2 values of 2 or 3 results in a priority value of 1, the highest priority for a location. In row 1210, a Flag 1 value of 1 and Flag 2 values of 1, 4, 5, 6, 7, 8 or 9, result in a priority value of 2. In row 1212, a Flag 1 value of either 2 or 3 and a Flag 2 value of 1 results in a priority value of 2. In row 1214, a Flag 1 value of 2 or 3 and a Flag 2 value of 2, 3, 4, 5, 6, 7, 8 or 9 results in a priority value of 3. In row 1216, a Flag 1 value of 4 or 5 and any value for Flag 2 results in a priority value of 3. Note that although only 3 priority values are shown in FIG. 12, and in other embodiments, other numbers of priority values may be provided. Further, in other embodiments, different values for Flag 1 and Flag 2 will be assigned to different priority values than those shown in FIG. 12.

The location priority values determined in step 910 are stored as location priorities 144. At step 912, server 110 determines if there are more locations that have been predicted to be targets of Boosters. If there are more locations, sever 110 returns to step 900 to select the next location. Steps 900-910 are then repeated for the newly selected location. When there are no more locations that have been predicted as being targets of a Booster at step 912, the process of setting priorities ends at step 914.

At step 216 of FIG. 2, assets protection server 110 sends alerts and location priorities to investigation centers based on predictions 132. In particular, assets protection server 110 groups the priorities in location priorities 144 and the alerts in predictions 132 based on which investigation center is responsible for the market found in market column 804. It then sends the grouped alerts to the investigation centers.

FIG. 13 provides an example of grouped alerts that are sent to an investigation center based on the predictions in table 801. In FIG. 13, alerts table 1300 includes the same columns as predictions table 801 of FIG. 8. In the example of FIG. 13, the investigation center has responsibility for northern California and thus includes markets such as Bay Area. In FIG. 13, assets protection server 110 has selected the alerts of rows 840, 842 and 844 of FIG. 8 to group for the investigation center for Northern California. As in table 801, rows 840 and 842 are not shaded and row 844 is shaded as indicated by the cross-hatching. The lack of shading for rows 840 and 842 designates those alerts as requiring the assignment of additional resources while the shading of row 844 indicates that the alert is being provided as information to the investigation center but the investigation center is not required to assign additional resources to intercept or apprehend the Booster associated with the alert. In particular, for the entries that are not shaded, the investigation center is instructed to add an additional person to each location predicted for a Booster during the date ranges and time ranges listed for the Booster. The additional personnel may either be positioned within the location or may be positioned at a remote location that has access to the video cameras at the location.

Figure 14:
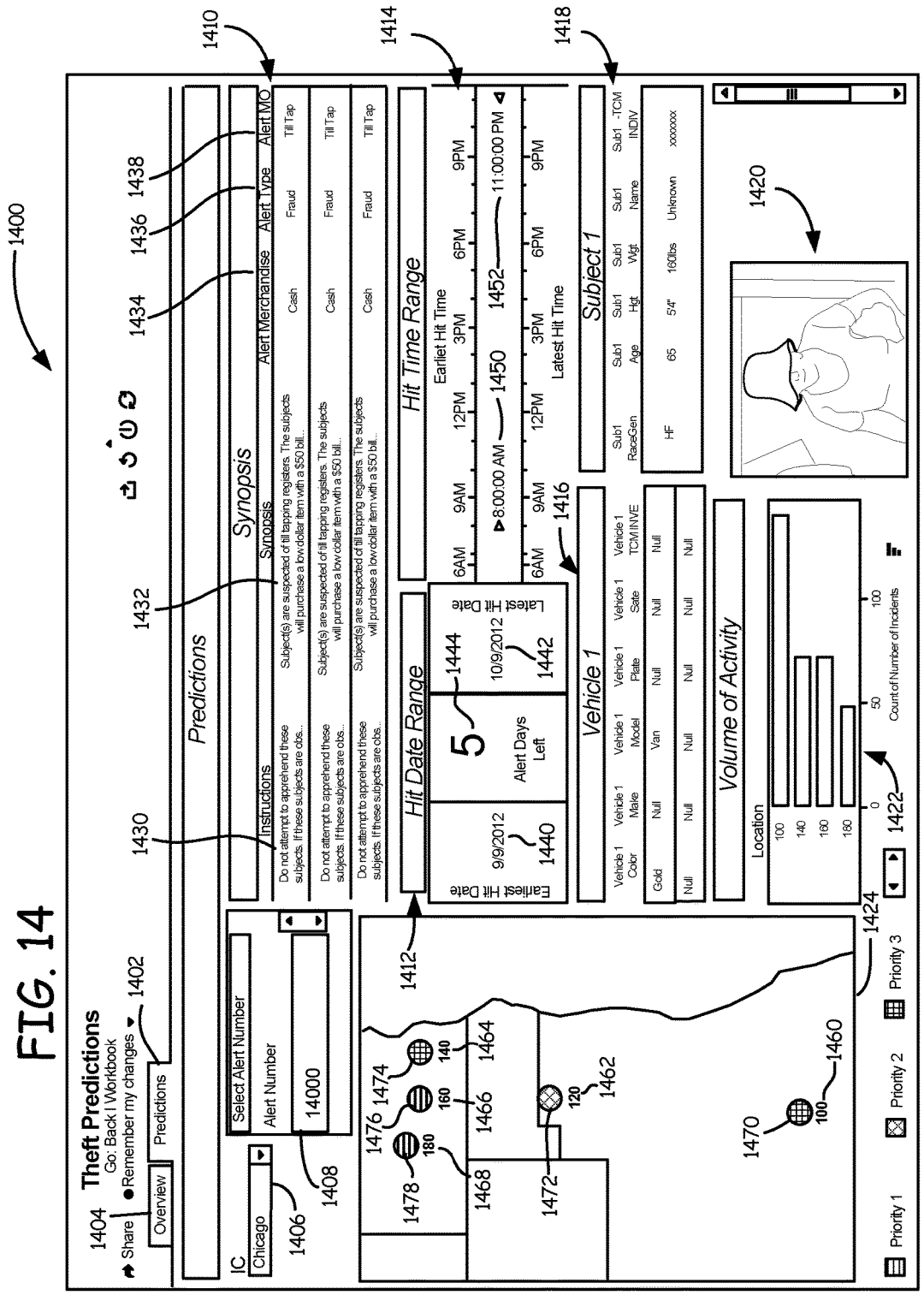
FIG. 14 is an example of a predictions user interface.

FIG. 14 provides an example of a user interface displayed at an investigation center 112 through a computing device having a display. User interface 1400 of FIG. 14 is generated based on Booster location, date range and time range predictions 132 and location priorities 144. User interface 1400 may be generated and displayed within investigation center 112 or may be generated by assets protection server 110 and then delivered to and displayed at investigation center 112.

User interface 1400 includes a predictions tab 1402 and an overview tab 1404. In FIG. 14, predictions tab 1402 has been selected. Predictions tab 1402 includes an investigation center selection box 1406, an alert number selection box 1408, a synopsis area 1410, a hit date range 1412, a hit time range 1414, a vehicle description 1416, a subject description 1418, an image 1420, a volume of activity area 1422 and a map 1424.

Investigation center selection box 1406 allows the user to select from a group of possible investigation centers using a pull down control. Selection of an investigation center in box 1406 causes the map in map area 1424 to display a geographic area associated with the selected investigation center such as a geographic area that encompasses all of the locations that the investigation center is responsible for protecting. The selection of the investigation center in box 1406 also assigns a set of alert numbers to alert selection box 1408, where each alert number in alert selection box 1408 is for an alert that has been assigned to the selected investigation center. Using alert selection box 1408, a user is able to select a particular alert. The selection of a single alert causes the map in map area 1424 to change to show all stores predicted to be a possible target of the Booster associated with the alert as determined from predictions 132 and location priorities 144.

Synopsis area 1410 provides a table having columns 1430, 1432, 1434, 1436 and 1438. Column 1430 provides instructions to employees at a location for responding to the appearance of the Booster at their location. Synopsis column 1432 provides a written description of the activity that the Booster is believed to have engaged in. Alert merchandise column 1434 indicates a type of merchandise or cash that is involved in the Booster's behavior. Alert type column 1436 indicates the type of alerts such as theft or fraud. Alert MO column 1438 provides keyword terms that describe the behavior of the Booster. Synopsis area 1410 can include multiple rows, with each row representing a past action that was thought to be perpetrated by the Booster.

Hit date range 1412 provides a date range for when the Booster is expected to strike next. Hit date range 1412 includes earliest hit date 1440, latest hit date 1442 and alert days left 1444. Alert days left 1444 represents the number of days between the latest hit date and the later of the current date and the earliest hit date. Hit time range 1414 provides time ranges for when the Booster is expected to strike. Hit time range 1414 includes earliest hit time 1450 and latest hit time 1452.

Vehicle section 1416 provides a description of the color, make, model and license plate of a vehicle associated with the Booster, if any. Subject 1418 provides information about the Booster such as the race and gender of the Booster, their estimated age, estimated height, estimated weight, name if known, and an I.D. number for the Booster that has been stored in Booster table 116.

Image 1420 provides an image of the Booster captured in videos 108, if such an image has been captured.

Volume of activity section 1422 provides a count of the number of incidents associated with a collection of locations shown in map 1424. Specifically, activity section provides a separate bar graph for each location in map 1424, with an identifier of the location placed to the left of the associated bar graph. For example, location number 100 is next to the largest bar in volume of activity section 1422 and corresponds to location identifier 1460 in map 1424.

Map 1424 includes location identifiers such as location identifiers 1460, 1462, 1464, 1466 and 1468, which uniquely identify each location. In addition, each location has an associated priority marker based on location priorities 144 such as priority markers 1470, 1472, 1474, 1476 and 1478. Locations with a priority level of 1 have their priority marker colored red in the embodiment of FIG. 14 as indicated by the horizontal lines of markers 1476 and 1478. Locations that have a priority level of 2 have their priority marker colored orange as indicated by the diagonal hashing of marker 1472. Locations with a priority level of 3 have their location marker colored yellow as indicated by the vertical and horizontal hashing of markers 1470 and 1474.

As different alerts are selected in alert number 1408, the content of synopsis area 1410, hit date range 1412, hit time range 1414, vehicle section 1416, subject section 1418, image 1420, volume of activity section 1422 and map 1424 will change to represent the information associated with the Booster of the selected alert number.

Figure 15:
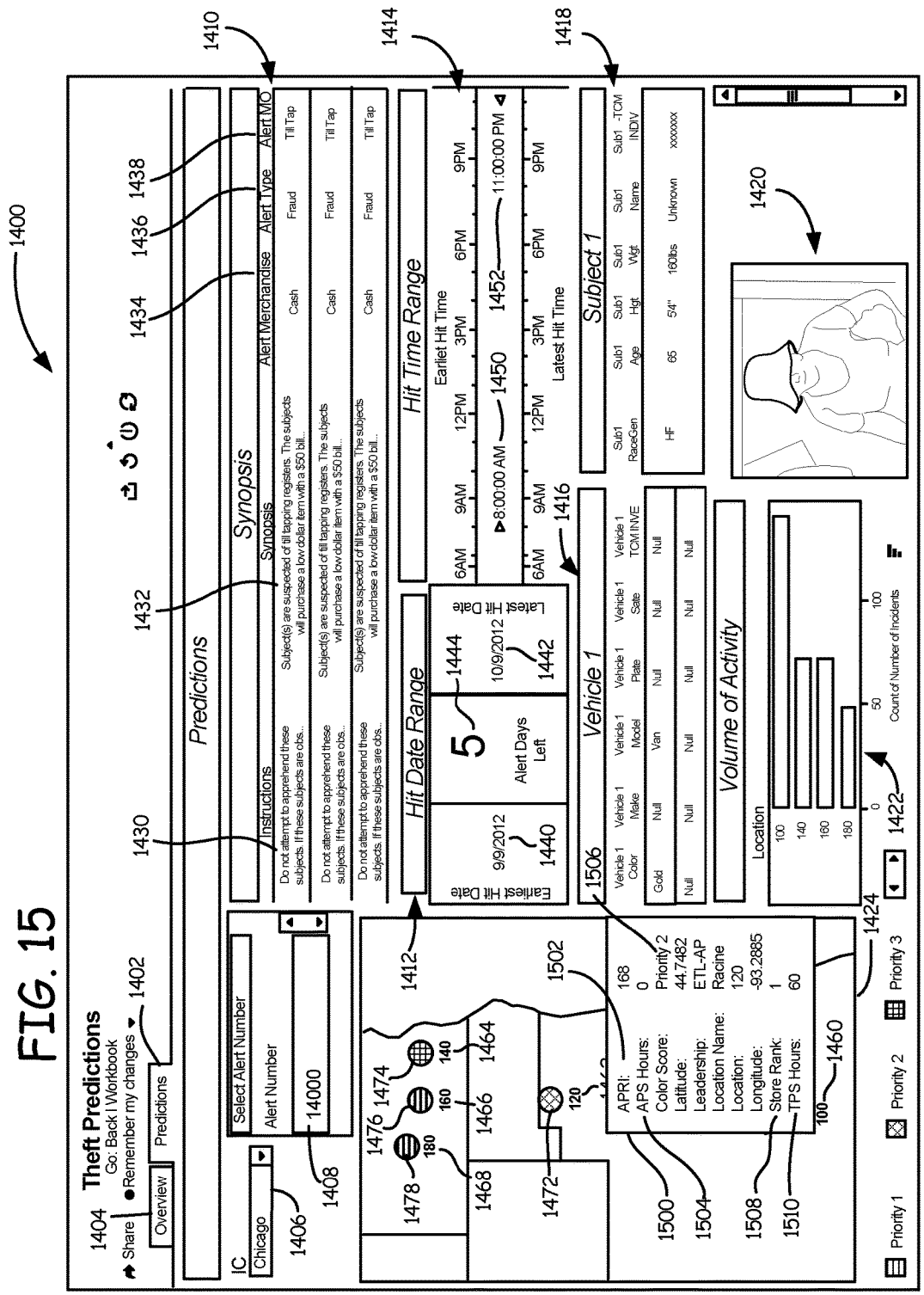
FIG. 15 is an example of a predictions user interface with a popup window.

Selecting one of the locations in map 1424 causes a popup window 1500 to appear as shown in FIG. 15. Popup window 1500 appears in FIG. 15 in response to the selection of location identifier 1462 or priority marker 1472 for location 120. Popup window 1500 includes a risk index score 1502, investigator hour value 1504 indicating the number of hours of investigator time currently assigned to the location, a priority level 1506, latitude and longitude of the location, an assets protection leadership level assigned to the location, a location name and location identifier, a store rank 1508 indicating the location order number for this location as taken from columns 822, 824 and 826 of FIG. 8, and security hours 1510 currently assigned to the location. When a different location identifier or priority marker is selected, a new popup window will be displayed that contains information for that location.

Figure 16:
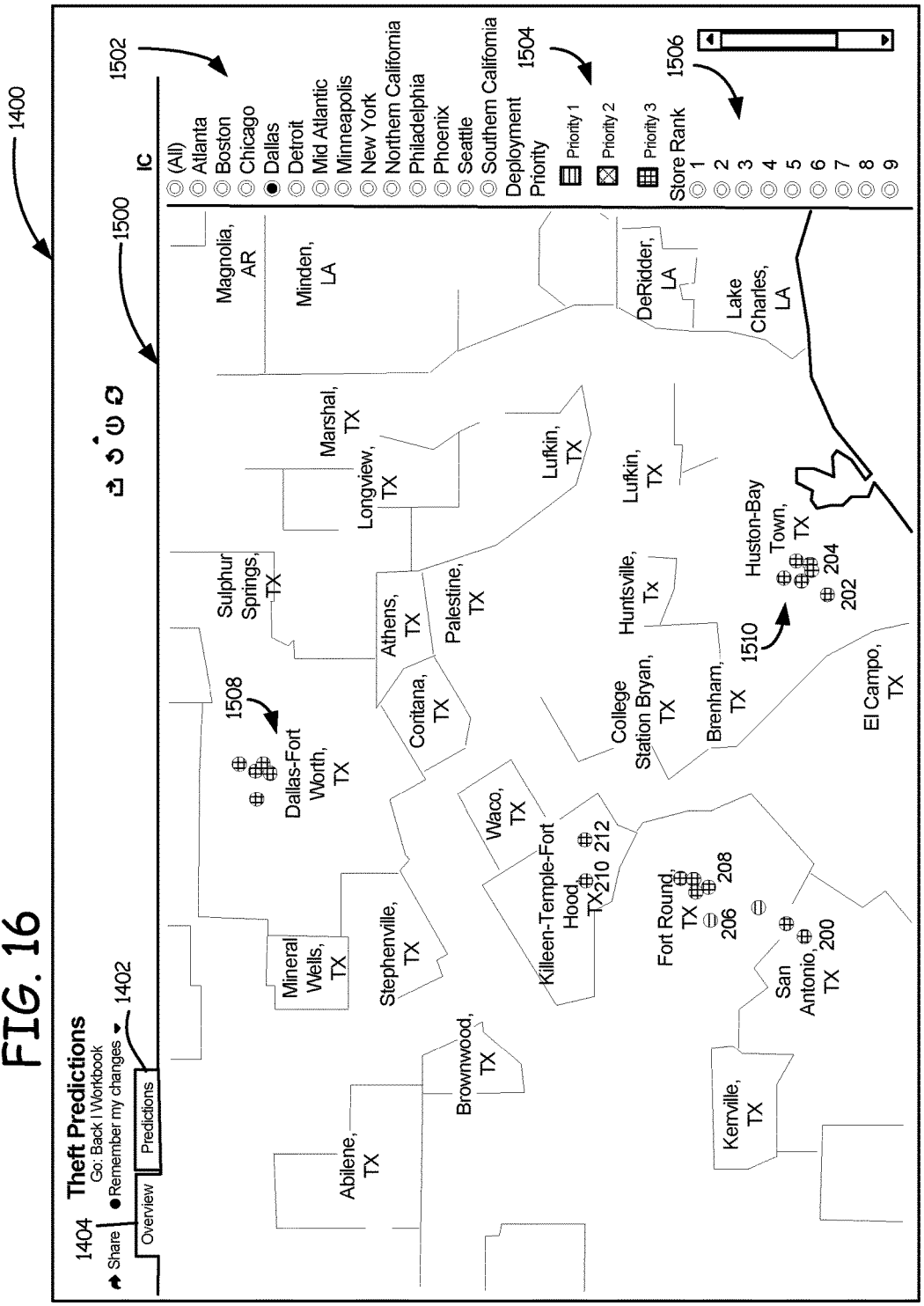
FIG. 16 is an example of an overview user interface.

FIG. 16 shows an example of overview tab 1404 of user interface 1400. Overview tab 1404 includes map area 1500, investigation center selection area 1502, deployment priority section 1504 and store rank section 1506. Investigation center selection area 1502 allows a user to select a particular investigation center or all available investigation centers by clicking on the name of the investigation center or the radio button next to the investigation center. The selected investigation center is indicated by a change in the radio button next to the name of the investigation center. In other embodiments, the name of the investigation center may be highlighted when it is selected. Based on the selection of an investigation center, map 1500 will be altered to show a geographic area that contains all of the locations supported by the selected investigation center. Deployment priority section 1504 allows a user to select from one of the three location priority levels to show only those locations with the selected priority level. If none of the three priority levels are selected, locations with any of the three priority levels are displayed in map area 1500. Store rank selection area 1506 allows a user to select locations with a particular prediction rank order to be displayed on map 1500. For example, if the user selects store rank 1, only stores that are predicted to be the most likely next target of a Booster are displayed on the map. Similarly, selecting store rank 3 will display only locations that are the third most likely location to be the next target of a Booster. Note that overview tab 1404 provides location markers for multiple Boosters at the same time such that there may be multiple locations shown with the selection of a single store rank. Thus, there may be multiple locations shown when store rank 1 is selected.

Map 1500 includes location markers such as location marker 1508 and 1510 that are colored to indicate the priority level of the location. In FIG. 16, priority 1 locations are indicated with red markers as denoted by horizontal lines in FIG. 16, priority 2 locations are indicated with orange markers as denoted by diagonal cross hatching in FIG. 16 and priority 3 locations are denoted with yellow markers as denoted by vertical and horizontal hatching in FIG. 16.

Overview tab 1404 allows a user to obtain a quick overview of the priority of all locations within an investigation center's support area at a glance.

An example of a computing device that can be used as a server and/or client device in the various embodiments described above is shown in the block diagram of FIG. 17. The computing device 10 of FIG. 17 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments above can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, non-volatile solid-state memory 25 an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid-state memory and external memory devices and their associated computer-readable media provide nonvolatile storage media for the computing device 10 on which computer-executable instructions and computer-readable data structures may be stored. Such computer-executable instructions can include instructions for performing any of the steps described in the methods above. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include collaboration application 114, conversion tools for synchronizing collaboration application lists with a database, conversion tools for converting database tables to standardized file formats, conversion tools for converting standardized file formats to database tables, data cleaning applications, a Booster model for predicting when and where a Booster will strike next, and tools for assigning and sending alerts to an investigation center. Program data 44 may include data stored in any of the databases or tables discussed above including the videos, incident data, Booster tables, incident tables, clean tables, location table, and prediction tables.

Input devices including a keyboard 63 and a mouse 65 are connected to system bus 16 through an Input/output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 17. The network connections depicted in FIG. 17 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

Figure 17:
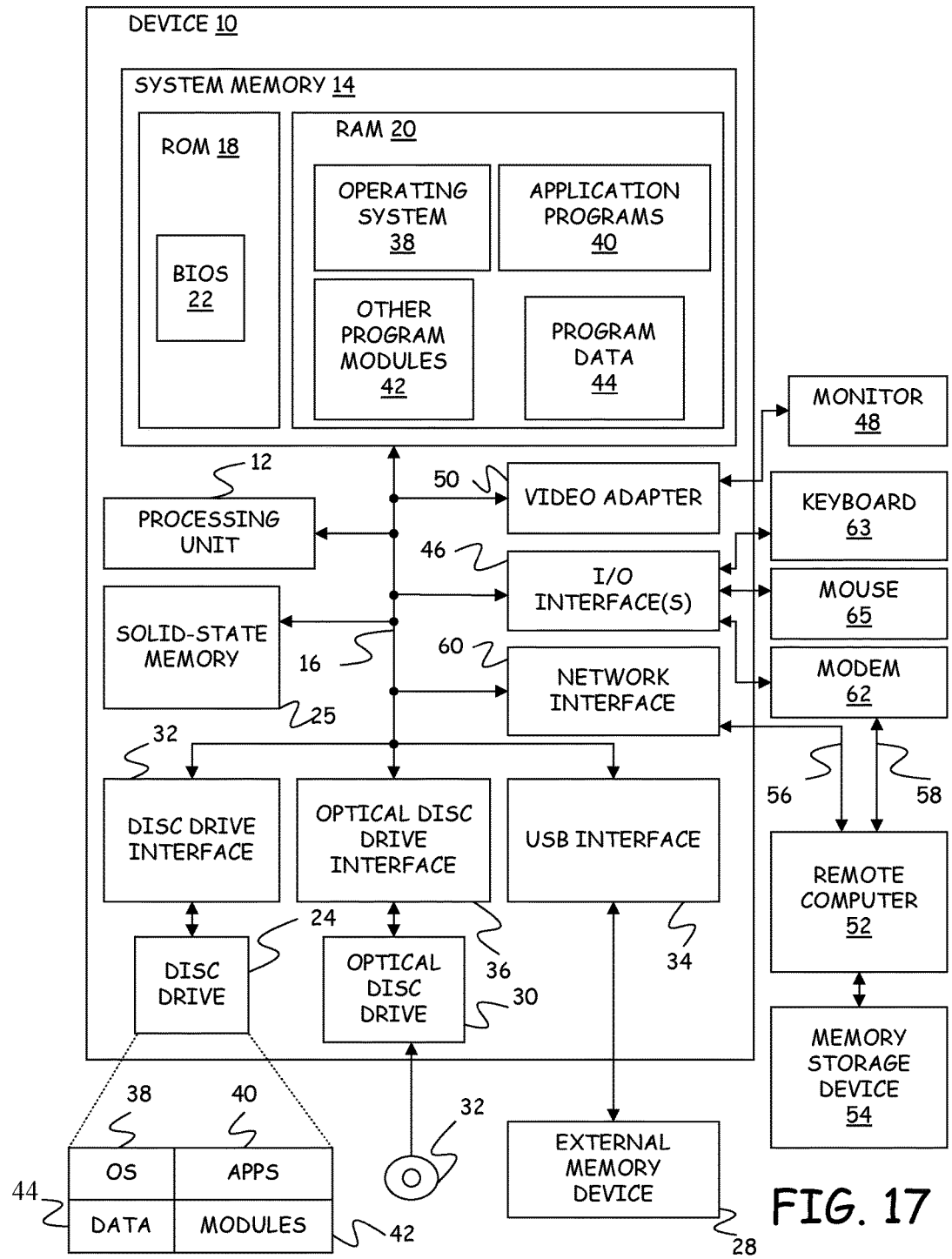
FIG. 17 is an example of a block diagram of a computer system that may be used as a client or server in embodiments of the disclosed methods.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or tables described above, may illustratively be stored within memory storage device 54. It will be appreciated that the network connections shown in FIG. 17 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:
1. A computer-implemented method comprising:
receiving a collection of incidents, each incident having an associated location where the incident occurred and a date and a time when the incident occurred;

determining, by a computer server, a mean distance between locations associated with successive incidents in the collection of incidents;

calculating a risk radius using the mean distance;

identifying a risk area around each location associated with each incident in the collection of incidents based on the risk radius;

generating a count for a set of at-risk locations, each at-risk location being positioned within at least one of the risk areas, and each count being the number of risk areas that an at-risk location is positioned within;

for each at-risk location in the set of at-risk locations, determining a distance between the at-risk location and a last location, wherein the last location is the location of the incident that occurred last in time in the collection of incidents;

recommending, by the computer server, allocating resources to select at-risk locations based on the count for each of the select at-risk locations and the distance between each of the select at-risk locations and the last location;

providing a display connected to at least one computer;

using the at least one computer, displaying on the display an interactive user interface, the interactive user interface including an interactive predictions tab and an interactive overview tab wherein upon a user interacting with the interactive predictions tab an interactive predictions user interface is displayed and upon a user interacting with the interactive overview tab an interactive overview user interface is displayed, the interactive predictions user interface having an interactive investigation center selection device that allows a user to select from a plurality of investigation centers wherein upon selection of an investigation center each of the following occurs: (i) a map of a geographical area associated with the selected investigation center is displayed on the interactive predictions user interface; and, (ii) a set of alert numbers are assigned to an interactive alert selection device on the interactive predictions user interface wherein upon selection of an alert number by a user interacting with the interactive alert selection device the map changes to show all locations predicted to be a target of a Booster associated with the selected alert number; and, the interactive overview user interface having a map area and an interactive deployment priority section having a plurality of interactive priority rankings wherein upon user selection of one of the plurality of priority rankings a map in the map area is displayed showing locations having the selected priority ranking.

2. The computer-implemented method of claim 1 wherein calculating a risk radius comprises multiplying the mean distance by a value greater than 1.

3. The computer-implemented method of claim 1 wherein each of the incidents in the collection of incidents involved a same entity.

4. The computer-implemented method of claim 3 wherein the same entity comprises a same individual.

5. The computer-implemented method of claim 1 wherein recommending, by the computer server, allocating resources to select at-risk locations comprises computing a risk factor for each at-risk location by dividing the count for the at-risk location by a log of the distance between the at-risk location and the last location and recommending allocating resources based on the risk factors.

6. The computer-implemented method of claim 5 wherein recommending allocating resources to select at-risk locations based on the risk factors of the at-risk locations comprises recommending allocating resources to a first set of at-risk locations and recommending not allocating resources to a second set of at-risk locations, wherein each of the at-risk locations where resources are recommended to be allocated has a risk factor that is larger than a risk factor of any of the at-risk locations where resources are not recommended to be allocated.

7. The computer-implemented method of claim 1 further comprising setting a date range during which resources are recommended to be allocated to at-risk locations based on dates when incidents in the collection of incidents occurred.

8. The computer-implemented method of claim 7 wherein setting a date range comprises:
determining a mean of a number of days between incidents in the collection of incidents;
determining a standard deviation of the number of days between incidents in the list of incidents;
setting an earliest date of the date range by adding a date of the incident that occurred last in time in the collection of incidents to the mean of the number of days between incidents to form a sum and subtracting the standard deviation of the number of days between incidents from the sum; and
setting a latest date of the date range by adding a date of the incident that occurred last in time in the collection of incidents to the mean of the number of days between incidents to form a second sum and adding the second sum to the standard deviation of the number of days between incidents.

9. The computer-implemented method of claim 1 further comprising setting a time range during which resources are recommended to be allocated to at-risk locations based on times when incidents in the collection of incidents occurred.

10. The computer-implemented method of claim 9 wherein setting a time range comprises:
determining a mean of the times when incidents in the collection of incidents occurred;
determining a standard deviation of the times when incidents in the collection of incidents occurred;
setting an earliest time of the time range by subtracting two times the standard deviation of the times from the mean of the times; and
setting a latest time of the time range by adding two times the standard deviation of the times to the mean of the times.

11. A computer-readable medium, not a signal, having computer-executable instructions stored thereon that cause a processor to perform steps comprising:
identifying a risk area around each of a collection of locations;
generating a count for a set of at-risk locations, each at-risk location being positioned within at least one of the risk areas, and each count being the number of risk areas that an at-risk location is positioned within; and
recommending, by the computer server, allocating resources to select at-risk locations based on the count for each of the select at-risk locations;
using at least one computer, displaying on a display an interactive user interface, the interactive user interface including at least one of an interactive predictions tab and an interactive overview tab wherein upon a user interacting with the interactive predictions tab an interactive predictions user interface is displayed and upon a user interacting with the interactive overview tab an interactive overview user interface is displayed, the interactive predictions user interface having an interactive investigation center selection device that allows a user to select from a plurality of investigation centers wherein upon selection of an investigation center each of the following occurs: (i) a map of a geographical area associated with the selected investigation center is displayed on the interactive predictions user interface; and, (ii) a set of alert numbers are assigned to an interactive alert selection device on the interactive predictions user interface wherein upon selection of an alert number by a user interacting with the interactive alert selection device the map changes to show all locations predicted to be a target of a Booster associated with the selected alert number; and, the interactive overview user interface having a map area and an interactive deployment priority section having a plurality of interactive priority rankings wherein upon user selection of one of the plurality of priority rankings a map in the map area is displayed showing locations having the selected priority ranking.

12. The computer-readable medium of claim 11 wherein identifying a risk area comprises:

calculating a risk radius based on a mean distance between incidents; and using the risk radius to identify the risk area.

13. The computer-readable medium of claim 12 wherein the collection of locations comprises locations where at least one of the incidents used to calculate the risk radius took place.

14. The computer-readable medium of claim 13 further comprising for each at-risk location in the set of at-risk locations, determining a distance between the at-risk location and a last location, wherein the last location is the location of the incident that occurred last in time in the collection of incidents.

15. The computer-readable medium of claim 14 wherein recommending allocating resources further comprises recommending allocating resources based in part on the distance between each at-risk location and the last location.

16. The computer-readable medium of claim 12 wherein each of the incidents involved a same entity.

17. The computer-readable medium of claim 11 further comprising setting a date range during which resources are recommended to be allocated to at-risk locations based on dates when incidents occurred.

18. A method comprising:

identifying a risk area around each of a collection of locations;

generating a count for a set of at-risk locations, each at-risk location being positioned within at least one of the risk areas, and each count being the number of risk areas that an at-risk location is positioned within; and recommending, by the computer server, allocating resources to select at-risk locations based on the count for each of the select at-risk locations and setting a date range during which resources are recommended to be allocated to the selected at-risk locations;

providing a display connected to at least one computer;

using the at least one computer, displaying on the display an interactive user interface, the interactive user interface including an interactive predictions tab and an interactive overview tab wherein upon a user interacting with the interactive predictions tab an interactive predictions user interface is displayed and upon a user interacting with the interactive overview tab an interactive overview user interface is displayed, the interactive predictions user interface having an interactive investigation center selection device that allows a user to select from a plurality of investigation centers wherein upon selection of an investigation center each of the following occurs: (i) a map of a geographical area associated with the selected investigation center is displayed on the interactive predictions user interface; and, (ii) a set of alert numbers are assigned to an interactive alert selection device on the interactive predictions user interface wherein upon selection of an alert number by a user interacting with the interactive alert selection device the map changes to show all locations predicted to be a target of a Booster associated with the selected alert number; and, the interactive overview user interface having a map area and an interactive deployment priority section having a plurality of interactive priority rankings wherein upon user selection of one of the plurality of priority rankings a map in the map area is displayed showing locations having the selected priority ranking.

19. The method of claim 18 wherein identifying a risk area comprises:

calculating a risk radius based on a mean distance between incidents; and using the risk radius to identify the risk area.

20. The method of claim 19 wherein the collection of locations comprises locations where at least one of the incidents used to calculate the risk radius took place.

21. The method of claim 20 further comprising for each at-risk location in the set of at-risk locations, determining a distance between the at-risk location and a last location, wherein the last location is the location of the incident that occurred last in time in the collection of incidents.

22. The method of claim 21 wherein recommending allocating resources further comprises recommending allocating resources based in part on the distance between each at-risk location and the last location.

23. The method of claim 19 wherein each of the incidents involved a same entity.

24. The method of claim 19 wherein setting a date range comprises using a mean time between incidents.

* * * * *